(12) United States Patent
Saitoh

(10) Patent No.: US 7,810,627 B2
(45) Date of Patent: Oct. 12, 2010

(54) DRIVE FORCE TRANSMITTING APPARATUS FOR VEHICLE

(75) Inventor: Noriaki Saitoh, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 502 days.

(21) Appl. No.: 11/747,536

(22) Filed: May 11, 2007

(65) Prior Publication Data
US 2007/0272511 A1  Nov. 29, 2007

(30) Foreign Application Priority Data
May 23, 2006   (JP) .............................. 2006-142338

(51) Int. Cl.
*B60W 10/18* (2006.01)
*B60W 10/10* (2006.01)

(52) U.S. Cl. ............. 192/219.5; 74/473.12; 74/473.37; 74/335

(58) Field of Classification Search ................ 192/219, 192/219.5, 222
See application file for complete search history.

(56) References Cited

U.S. PATENT DOCUMENTS
6,588,294 B1 * 7/2003 Rogg ....................... 74/473.21

FOREIGN PATENT DOCUMENTS
JP    59-222668 A   12/1984
JP    2001-50392 A   2/2001

* cited by examiner

*Primary Examiner*—David D Le
*Assistant Examiner*—Ryan Dodd
(74) *Attorney, Agent, or Firm*—Westerman, Hattori, Daniels & Adrian, LLP

(57) ABSTRACT

A drive force transmitting apparatus for a vehicle including a drive source, a drive force transmitting path adapted to be connected to a drive shaft to transmit a drive force from the drive source to the drive shaft, and a clutch mechanism capable of connecting and disconnecting the drive force transmitting path. The drive force transmitting apparatus further includes a parking mechanism provided in the drive force transmitting path and capable of stopping the rotation of the drive shaft and an actuator mechanism capable of selectively operating the clutch mechanism and the parking mechanism.

3 Claims, 5 Drawing Sheets

DRIVE FORCE TRANSMITTING APPARATUS FOR VEHICLE

BACKGROUND OF THE INVENTION

1. Field of the Invention

The present invention relates to a drive force transmitting apparatus for a vehicle including a drive force connecting and disconnecting mechanism (clutch mechanism) and a parking mechanism.

2. Description of the Related Art

A parking lock apparatus in a vehicle having a continuously variable transmission (CVT) is disclosed in Japanese Patent Laid-open No. Sho 59-222668. The parking lock apparatus disclosed in this publication is provided in an auxiliary transmission added to the CVT. This auxiliary transmission includes an input shaft, an output shaft, and an intermediate shaft (reverse idler shaft) and further includes a parking shaft extending parallel to each shaft mentioned above and nonrotatably mounted to a transmission case.

A parking gear is nonrotatably mounted on this parking shaft. A reverse driven gear is axially slidably provided on the output shaft. In effecting a parking lock condition, the reverse driven gear is selectively engaged with the parking gear to thereby lock the transmission. In the parking lock apparatus disclosed in Japanese Patent Laid-open No. sho 59-222668, however, the parking shaft for mounting the parking gear must be specially added, causing an increase in size of the transmission case and further causing a great increase in total weight of the transmission.

A parking lock apparatus in a parallel axes type transmission is disclosed in Japanese Patent Laid-open No. 2001-50392. The parking lock apparatus disclosed in this publication includes a lock gear adapted to be selectively engaged with a reverse idle gear provided in a transmission case. The reverse idle gear is movable among a neutral position, a reverse position where the reverse idle gear meshes with a main shaft reverse gear and a counter shaft reverse gear, and a parking position where the reverse idle gear meshes with at least the main shaft reverse gear and the lock gear. In the parking lock apparatus disclosed in Japanese Patent Laid-open No. 2001-50392, however, a reverse mechanism and a parking mechanism are commonly used. Accordingly, this parking lock apparatus cannot be applied to a hybrid vehicle or the like such that a motor is used for reverse running.

SUMMARY OF THE INVENTION

It is therefore an object of the present invention to provide a drive force transmitting apparatus for a vehicle having an actuator mechanism capable of selectively operating a clutch mechanism and a parking mechanism.

In accordance with an aspect of the present invention, there is provided a drive force transmitting apparatus for a vehicle including: a drive source; a drive force transmitting path adapted to be connected to a drive shaft to transmit a drive force from the drive source to the drive shaft; a clutch mechanism capable of connecting and disconnecting the drive force transmitting path; a parking mechanism provided in the drive force transmitting path and capable of stopping the rotation of the drive shaft; and an actuator mechanism capable of selectively operating the clutch mechanism and the parking mechanism.

With this arrangement, the drive force transmitting apparatus includes the actuator mechanism capable of selectively operating the clutch mechanism and the parking mechanism. Accordingly, as compared with the case that any dedicated selector apparatus is provided for each mechanism, the number of parts can be greatly reduced to thereby greatly reduce the cost and weight of the drive force transmitting apparatus.

Preferably, the actuator mechanism can switch among a first condition where the clutch mechanism is engaged to connect the drive force transmitting path, and the parking mechanism is disengaged to cancel a parking lock condition where the drive shaft is fixed in rotation; a second condition where the clutch mechanism is disengaged to disconnect the drive force transmitting path, and the parking mechanism is disengaged to cancel the parking lock condition; and a third condition where the clutch mechanism is disengaged to disconnect the drive force transmitting path, and the parking mechanism is engaged to effect the parking lock condition.

Accordingly, in the case that the parking mechanism is engaged to effect the lock condition of the vehicle, the clutch mechanism is always kept in its disengaged condition. Conversely, in the case that the clutch mechanism is engaged to effect the on-line condition where the drive source is connected to the drive shaft, the parking mechanism is always kept in its disengaged condition. Accordingly, it is possible to prevent a malfunction such that the parking mechanism is engaged during running by the drive source.

Preferably, the actuator mechanism includes a rotating shaft to which a cam portion and a parking pivot portion are fixed, means for pivotally rotating the rotating shaft, and an operating fork adapted to be moved by the cam portion for operating the clutch mechanism; the clutch mechanism is selectively engaged by pivotally rotating the cam portion together with the rotating shaft to thereby move the operating fork; and the parking mechanism includes a parking pawl adapted to be pivotally rotated by pivotally rotating the parking pivot portion together with the rotating shaft and a parking gear fixed to the drive shaft, the parking pawl being engageable with the parking gear.

More preferably, the cam portion includes a one-way cam mechanism adapted to move the operating fork in the case of switching between the second condition and the first condition and not to move the operating fork in the case of switching between the second condition and the third condition.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 5B is a view similar to FIG. 5A, showing a neutral condition, and FIG. 5C is a view similar to FIG. 5A, showing the case of performing a parking lock operation.

DETAILED DESCRIPTION OF THE PREFERRED EMBODIMENTS

Figure 1:
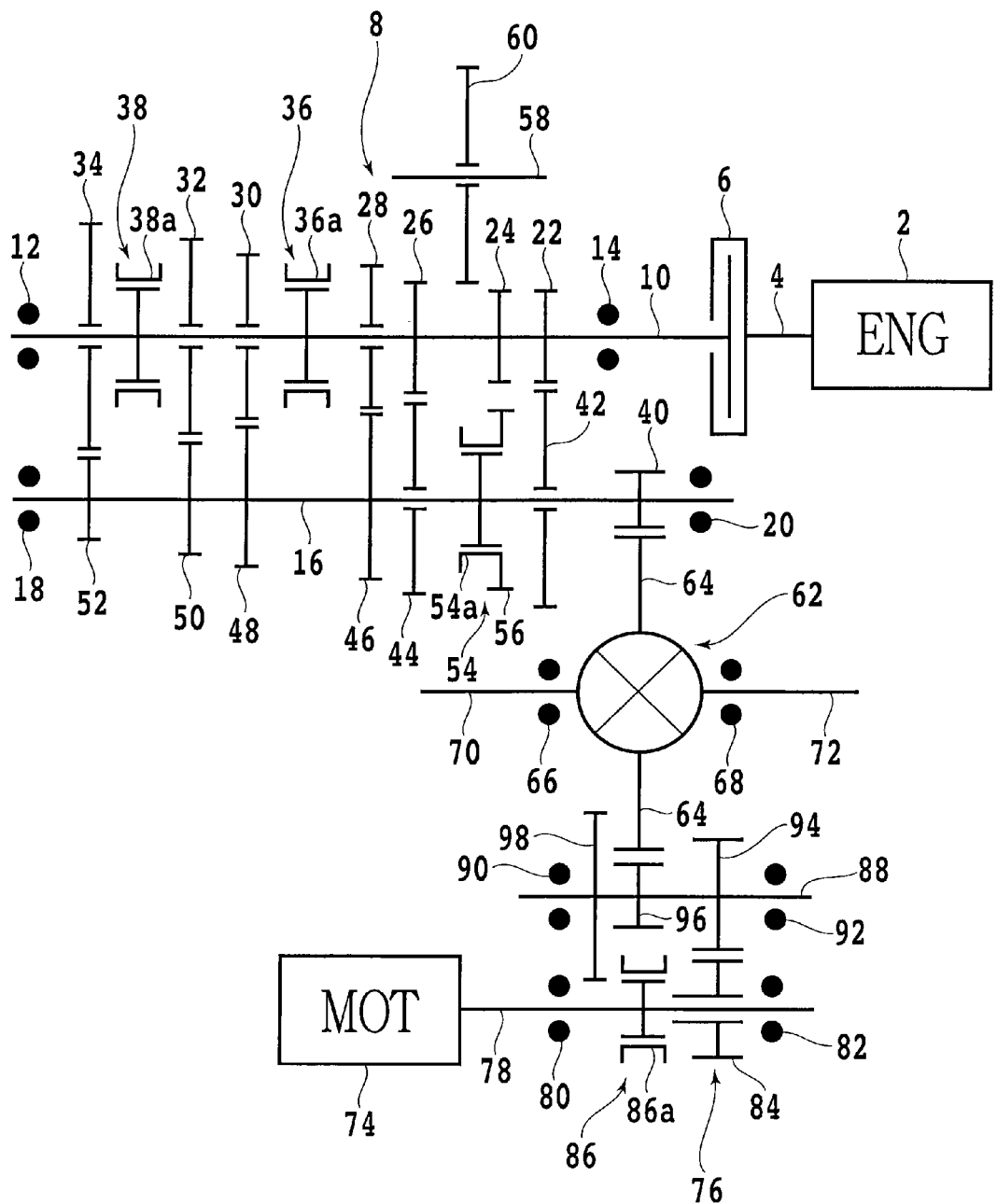
FIG. 1 is a skeleton diagram of a drive force transmitting apparatus according to a preferred embodiment of the present invention.

FIG. 1 is a skeleton diagram of a drive force transmitting apparatus for a hybrid vehicle according to a preferred embodiment of the present invention. A crankshaft 4 of an engine 2 is connected to a clutch 6. A drive force generated by the engine 2 is input to a main shaft (input shaft) 10 of a transmission 8 by engaging the clutch 6. The configuration of the clutch 6 may be of such a type that it is manually disengaged by depressing a clutch pedal or automatically disengaged by an actuator. The main shaft 10 of the transmission 8 is rotatably supported by a pair of bearings 12 and 14. A counter shaft (output shaft) 16 extending parallel to the main shaft 10 is also rotatably supported by a pair of bearings 18 and 20.

There are provided on the main shaft 10 a first speed drive gear 22, a reverse drive gear 24, a second speed drive gear 26, a third speed drive gear 28, a 3-4 speed synchromesh mechanism 36, a fourth speed drive gear 30, a fifth speed drive gear 32, a 5-6 speed synchromesh mechanism 38, and a sixth speed drive gear 34. These elements 22, 24, 26, 28, 36, 30, 32, 38, and 34 are arranged in this order in the axial direction of the main shaft 10 from the right end thereof as viewed in FIG. 1. The first speed drive gear 22, the reverse drive gear 24, and the second speed drive gear 26 are fixedly mounted on the main shaft 10 so as to be nonrotatable relative thereto. The third speed drive gear 28, the fourth speed drive gear 30, the fifth speed drive gear 32, and the sixth speed drive gear 34 are idly mounted on the main shaft 10 so as to be rotatable relative thereto.

As well known in the art, the third speed drive gear 28 or the fourth speed drive gear 30 is fixed (connected) to the main shaft 10 by sliding a synchronizer sleeve 36a of the 3-4 speed synchromesh mechanism 36 in the rightward or leftward direction as viewed in FIG. 1. Similarly, the fifth speed drive gear 32 or the sixth speed drive gear 34 is fixed (connected) to the main shaft 10 by sliding a synchronizer sleeve 38a of the 5-6 speed synchromesh mechanism 38 in the rightward or leftward direction as viewed in FIG. 1.

There are provided on the counter shaft 16 a final drive gear 40, a first speed driven gear 42, a 1-2 speed synchromesh mechanism 54, a second speed driven gear 44, a third speed driven gear 46, a fourth speed driven gear 48, a fifth speed driven gear 50, and a sixth speed driven gear 52. These elements 40, 42, 54, 44, 46, 48, 50, and 52 are arranged in this order in the axial direction of the counter shaft 16 from the right end thereof as viewed in FIG. 1. The final drive gear 40, the third speed driven gear 46, the fourth speed driven gear 48, the fifth speed driven gear 50, and the sixth speed driven gear 52 are fixedly mounted on the counter shaft 16 so as to be nonrotatable relative thereto. The first speed driven gear 42 and the second speed driven gear 44 are idly mounted on the counter shaft 16 so as to be rotatable relative thereto.

The first speed driven gear 42 or the second speed driven gear 44 is fixed (connected) to the counter shaft 16 by sliding a synchronizer sleeve 54a of the 1-2 speed synchromesh mechanism 54 in the rightward or leftward direction as viewed in FIG. 1. The synchronizer sleeve 54a of the 1-2 speed synchromesh mechanism 54 is integrally formed with a reverse driven gear 56. A reverse idle gear 60 is idly mounted on a reverse shaft 58 so as to be rotatable relative thereto. By sliding the reverse idle gear 60 in the rightward direction as viewed in FIG. 1 to bring it into mesh with the reverse drive gear 24 and the reverse driven gear 56, the counter shaft 16 is rotated in the reverse direction opposite to the forward direction in forward running, thereby allowing reverse running.

Reference numeral 62 denotes a differential unit having a ring gear 64. The ring gear 64 of the differential unit 62 is in mesh with the final drive gear 40. An output from the differential unit 62 is transmitted to drive wheels (not shown) through drive shafts 70 and 72 respectively rotatably supported by bearings 66 and 68. On the other hand, a drive force generated by an electric motor 74 is transmitted through a speed reducing mechanism 76 to the differential unit 62. The speed reducing mechanism 76 has a primary shaft 78 connected to the output shaft of the electric motor 74 and a secondary shaft (drive shaft) 88 extending parallel to the primary shaft 78.

The primary shaft 78 is rotatably supported by a pair of bearings 80 and 82, and the secondary shaft 88 is rotatably supported by a pair of bearings 90 and 92. A drive gear 84 is idly mounted on the primary shaft 78 so as to be rotatable relative thereto. The drive gear 84 is fixed (connected) to the primary shaft 78 by sliding a synchronizer sleeve 86a of a synchromesh mechanism (clutch mechanism) 86 in the rightward direction as viewed in FIG. 1. There are provided on the secondary shaft 88, a driven gear 94, a final drive gear 96, and a parking gear 98. These elements 94, 96, and 98 are arranged in this order in the axial direction of the secondary shaft 88 from the right end thereof as viewed in FIG. 1. All of the driven gear 94, the final drive gear 96, and the parking gear 98 are fixedly mounted on the secondary shaft 88.

In the case of running by the drive force of the engine 2, the synchronizer sleeve 86a of the synchronizer mechanism (clutch mechanism) 86 provided on the primary shaft 78 is kept in its neutral position as shown in FIG. 1, and the clutch 6 is engaged. As a result, the drive force of the engine 2 is transmitted through the clutch 6 and the transmission 8 to the ring gear 64 of the differential unit 62, thereby driving the drive wheels through the drive shafts 70 and 72.

In the case of running by the drive force of the electric motor 74, the clutch 6 is disengaged and the synchronizer sleeve 86a of the synchromesh mechanism 86 is slid in the rightward direction as viewed in FIG. 1 to fix (connect) the drive gear 84 to the primary shaft 78. As a result, the drive force of the electric motor 74 is transmitted through the primary shaft 78, the drive gear 84, the driven gear 94, the secondary shaft 88, and the final drive gear 96 to the ring gear 64 of the differential unit 62, thereby driving the drive wheels (not shown) through the drive shafts 70 and 72.

Reverse running is allowed by any one of the engine 2 and the electric motor 74. In the case of reverse running by the engine 2, the reverse idle gear 60 is slid in the rightward direction as viewed in FIG. 1 to bring it into mesh with the reverse drive gear 24 and the reverse driven gear 56. As a result, the counter shaft 16 is rotated in the reverse direction opposite to the forward direction in forward running, thereby allowing reverse running through the differential unit 62. In the case of reverse running by the electric motor 74, the drive gear 84 is fixed (connected) through the synchromesh mechanism 86 to the primary shaft 78, and the rotational direction of the motor 74 is changed from the forward direction to the reverse direction.

Referring next to FIGS. 2 to 5C, there is shown an actuator mechanism for selectively operating a clutch mechanism (synchromesh mechanism) and a parking mechanism in the drive force transmitting apparatus described above.

Figure 2:
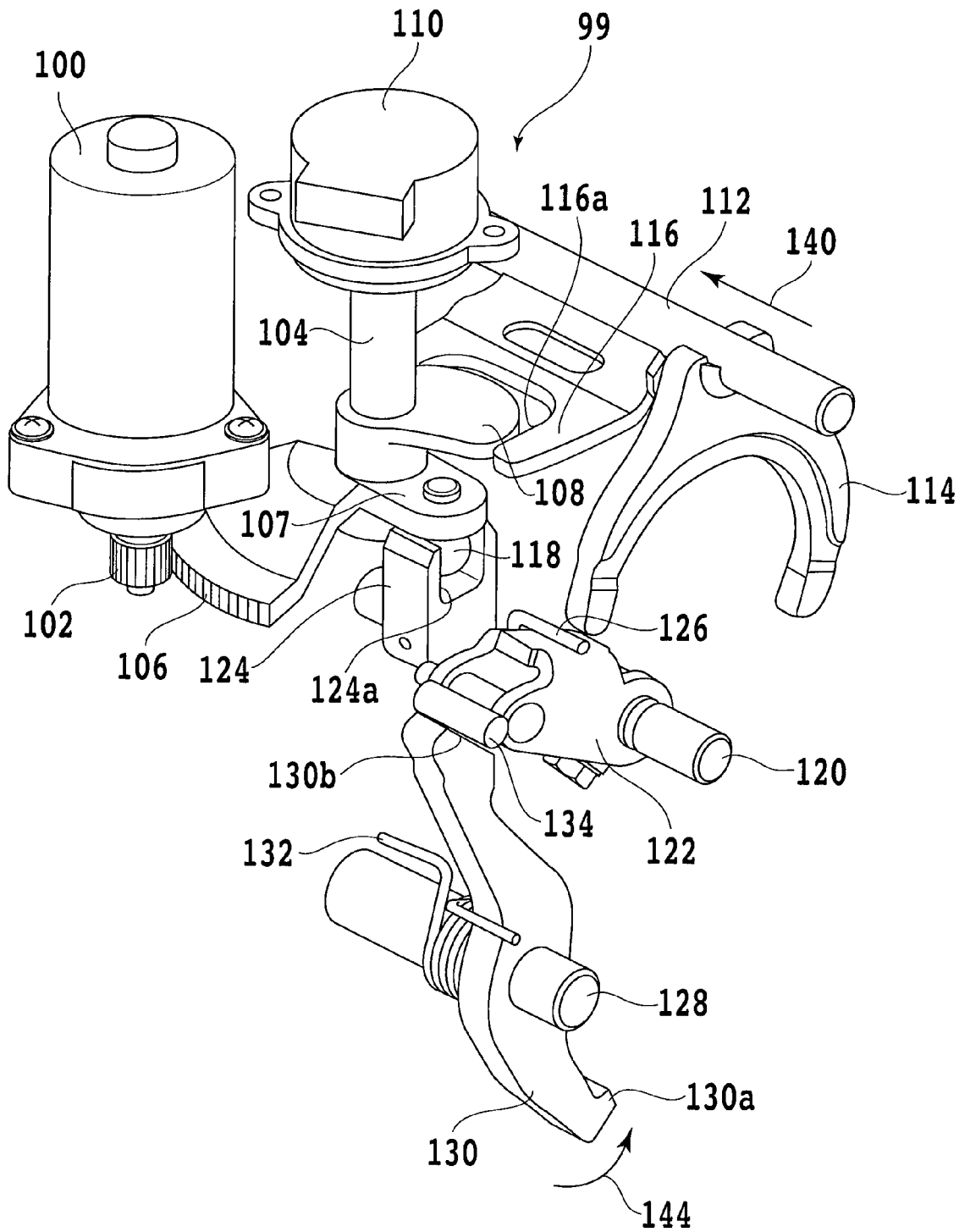
FIG. 2 is a perspective view of an actuator mechanism according to the preferred embodiment of the present invention.
Figure 3:
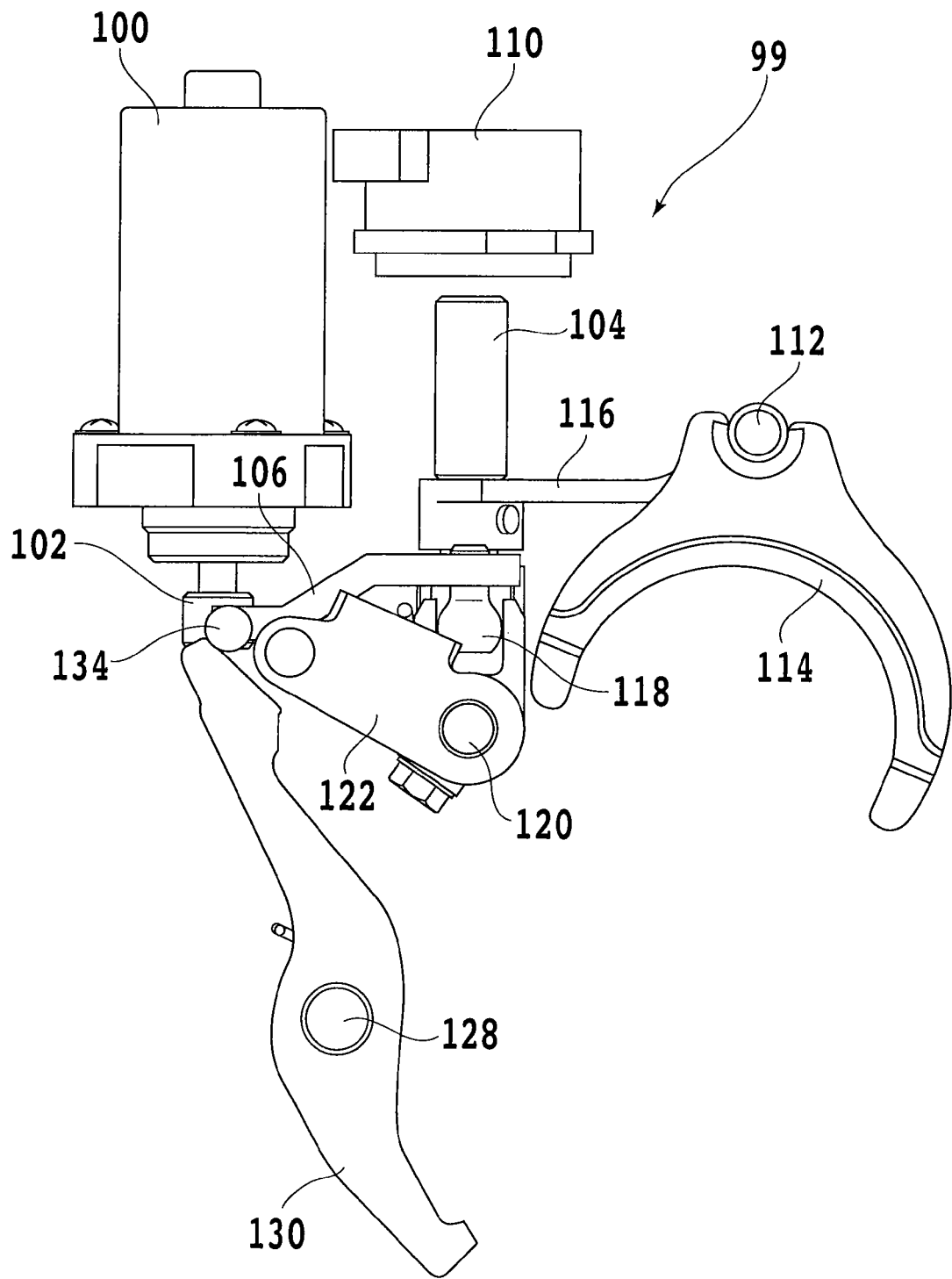
FIG. 3 is an elevational view of the actuator mechanism.
Figure 4:
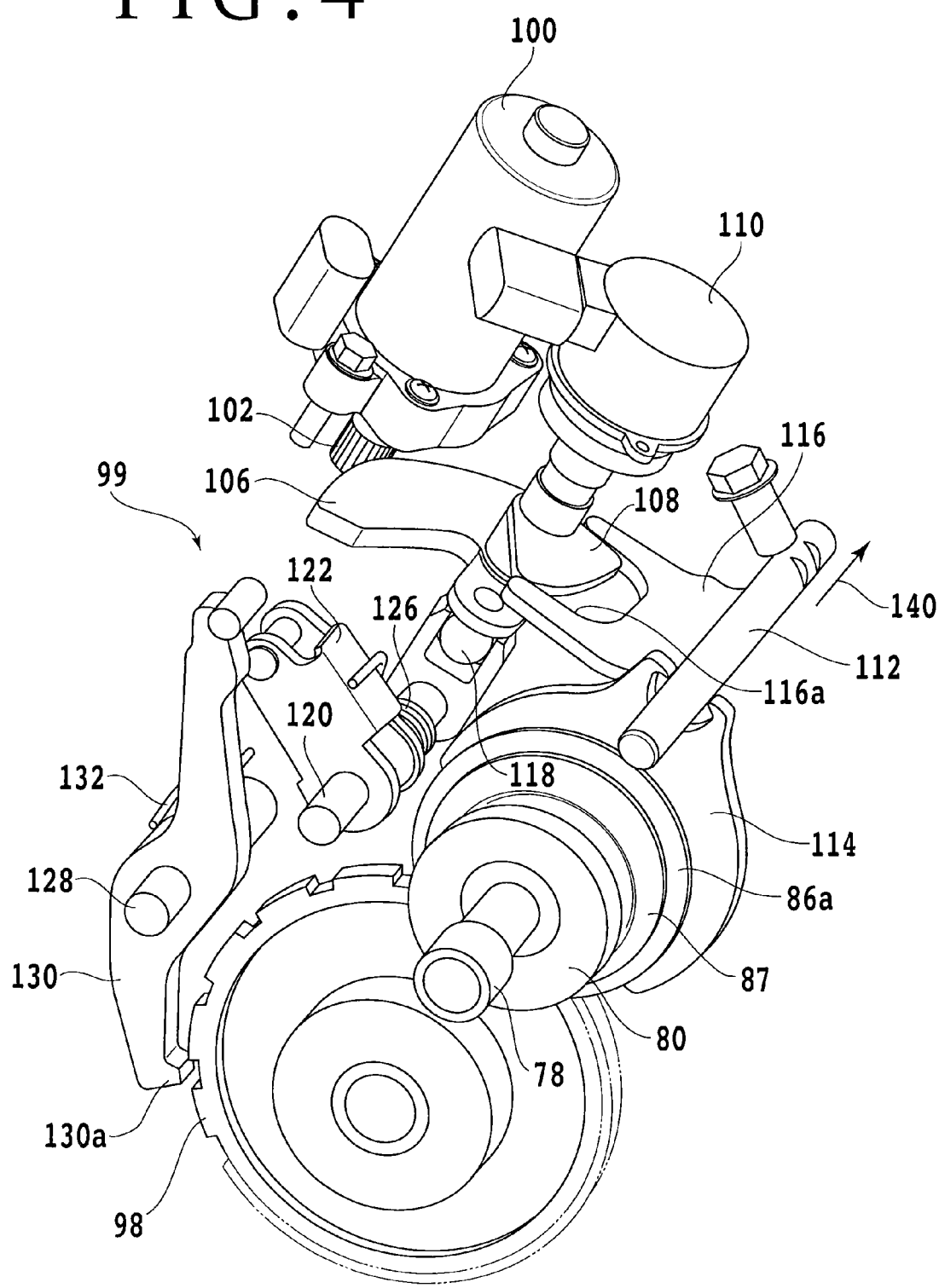
FIG. 4 is a perspective view of the actuator mechanism as viewed from the back side.

FIG. 2 is a perspective view of the actuator mechanism 99, FIG. 3 is an elevational view of the actuator mechanism 99, and FIG. 4 is a perspective view of the actuator mechanism 99 as viewed from the back side thereof. As best shown in FIG. 2, a drive gear 102 is fixedly mounted on the output shaft of a motor 100. Reference numeral 104 denotes a one-way camshaft. A sectorial driven gear 106 meshing with the drive gear 102 and a one-way cam 108 are fixedly mounted on the one-way camshaft 104. Reference numeral 110 denotes a rotational angle sensor such as a resolver for detecting a rotational direction and rotational angle of the one-way camshaft 104.

Reference numeral 112 denotes a fork shaft for operating the clutch mechanism 86. A cam follower 116 having a U-shaped recess 116a and an operating fork 114 are fixedly mounted on the fork shaft 112. The one-way cam 108 is inserted in the U-shaped recess 116a of the cam follower 116. As shown in FIG. 4, the operating fork 114 is engaged with the synchronizer sleeve 86a of the synchromesh mechanism (clutch mechanism) 86. In FIG. 4, reference numeral 87 denotes a stopper for preventing axial escape of the synchronizer sleeve 86a. The stopper 87 is provided on a synchronizer hub (not shown) included in the synchromesh mechanism 86.

The driven gear 106 is integrally formed with a mounting bracket 107, and a ball-shaped pivot 118 is fixed to the mounting bracket 107 so as to project downward. The ball-shaped pivot 118 is inserted in a U-shaped recess 124a of a socket 124 fixed to a parking lever shaft 120. The parking lever shaft 120 is rotatably supported, and a parking lever 122 is fixedly mounted on the parking lever shaft 120 so as to be biased counterclockwise as viewed in FIG. 3 by a coil spring 126. The counterclockwise rotation of the parking lever 122 is restricted by a stopper (not shown) provided in the parking lever 122.

A parking pawl 130 is rotatably mounted on a parking pawl shaft 128 fixed. An engaging portion 130a is formed at one end of the parking pawl 130. The engaging portion 130a of the parking pawl 130 is adapted to selectively engage the parking gear 98 shown in FIG. 4, thereby nonrotatably locking the secondary shaft 88 to which the parking gear 98 is fixed. The parking pawl 130 is biased clockwise as viewed in FIG. 3 by a return spring 132, and the other end 130b of the parking pawl 130 abuts against a stopper pin 134, thereby restricting the clockwise rotation of the parking pawl 130.

The operation of the actuator mechanism 99 will now be described. When the motor 100 is energized to counterclockwise rotate the one-way camshaft 104 through the drive gear 102 and the driven gear 106, the one-way cam 108 is rotated counterclockwise as shown by an arrow 138 in FIG. 5A to thereby move the cam follower 116 in the direction shown by an arrow 140. Accordingly, as shown in FIGS. 2 and 4, the fork shaft 112 and the operating fork 114 fixed to the fork shaft 112 are moved in the direction of the arrow 140. As a result, the synchronizer sleeve 86a of the synchromesh mechanism 86 is moved in the rightward direction as viewed in FIG. 1 to come into engagement with the drive gear 84, so that the drive gear 84 is fixed (connected) through the synchromesh mechanism (clutch mechanism) 86 to the primary shaft 78.

Accordingly, the drive force of the electric motor 74 is transmitted through the primary shaft 78, the drive gear 84, the driven gear 94, the secondary shaft 88, the final drive gear 96 to the differential unit 62, thereby driving the drive wheels (not shown) through the drive shafts 70 and 72. When the clutch 6 is engaged in this case, the drive force of the engine 2 is added to the drive force of the electric motor 74, thereby obtaining a large drive torque. When the clutch 6 is disengaged, the vehicle is driven by the drive force of the electric motor 74 only, that is, the previous motor driven condition of the vehicle is restored.

Figure 5A:
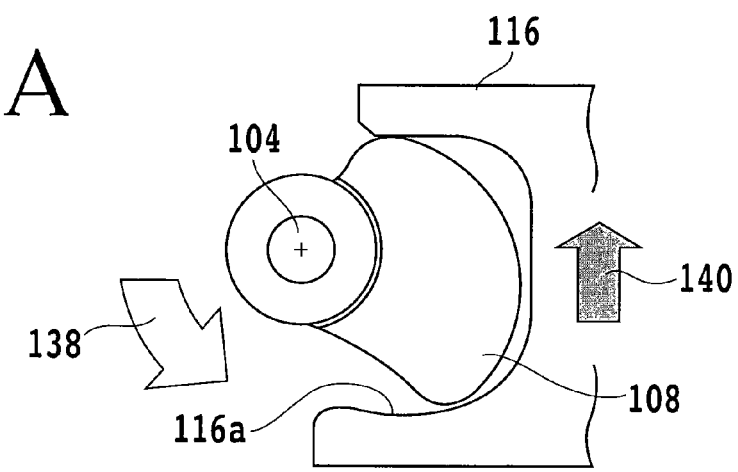
FIGS. 5A to 5C are schematic plan views for illustrating the operation of a one-way cam, specifically FIG. 5A includes in the actuator mechanism in the case of engaging a clutch mechanism.
Figure 5B:
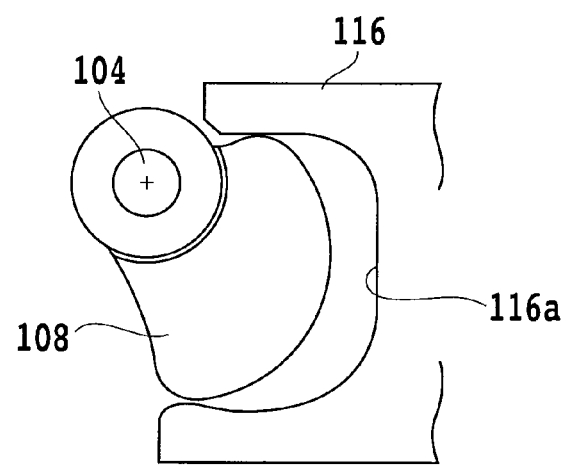

In the case of canceling the running by the electric motor 74, the rotational direction of the motor 100 is reversed to clockwise rotate the one-way camshaft 104, thereby clockwise rotating the one-way cam 108 to the neutral condition shown in FIG. 5B. As a result, the cam follower 116 is moved in the direction opposite to the direction of the arrow 140, thereby disengaging the synchronozer sleeve 86a from the drive gear 84. Accordingly, the drive gear 84 becomes rotatable relative to the primary shaft 78, so that the drive force of the electric motor 74 is not transmitted to the secondary shaft 88.

In the neutral condition of the one-way cam 108 as shown in FIG. 5B, there is no possibility that the cam follower 116 may be moved by the one-way cam 108 because of vibrations, impact, etc. Conversely, in the event that the one-way cam 108 is rotated by a large external force due to vibrations, impact, etc. from the cam follower 116, i.e., from the operating fork 114, such a malfunction is immediately detected by the rotational angle sensor 110, and the motor 100 is operated under feedback control in the direction reverse to the direction of the malfunction, thereby preventing the malfunction.

When the motor 100 is operated in the reverse direction from the neutral condition shown in FIG. 5B to clockwise rotate the one-way camshaft 104 through the drive gear 102 and the driven gear 106, the parking lever shaft 120 is rotated counterclockwise as viewed in FIG. 3 through the ball-shaped pivot 118 and the socket 124. As a result, the parking lever 122 is rotated counterclockwise to push the other end 130b of the parking pawl 130, so that the parking pawl 130 is rotated counterclockwise as shown by an arrow 144 in FIG. 2 to thereby bring the engaging portion 130a into engagement with the parking gear 98. Accordingly, the secondary shaft 88 is fixed in rotation by the parking pawl 130, thus attaining a parking lock function.

Figure 5C:
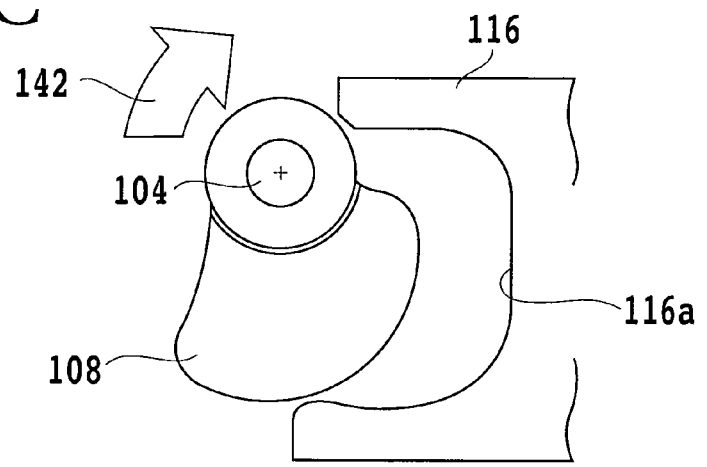

At this time, the one-way cam 108 is rotated clockwise as shown by an arrow 142 in FIG. 5C. In this clockwise rotation, the one-way cam 108 does not engage with the cam follower 116 at any position owing to the specific shapes of the one-way cam 108 and the cam follower 116 as shown in FIG. 5C. In other words, the one-way cam 108 is rotated clockwise without interference with the cam follower 116, i.e. the one-way cam 108 misses rotating in the cam follower 116 so that the movement of the operating fork 114 can be reliably prevented in performing the parking lock operation.

In the case of canceling the parking lock condition, the motor 100 is operated in the forward direction opposite to the operational direction in the parking lock operation, thereby counterclockwise rotating the one-way camshaft 104 to return the one-way cam 108 to the neutral condition shown in FIG. 5B. As a result, the parking lever shaft 120 and the parking lever 122 are rotated clockwise as viewed in FIG. 3, so that the parking pawl 130 is rotated clockwise by the biasing force of the return spring 132. As a result, the engaging portion 130a of the parking pawl 130 is disengaged from the parking gear 98, thus canceling the parking lock condition.

According to the preferred embodiment mentioned above, the drive force transmitting apparatus includes the actuator mechanism 99 capable of selectively operating the clutch mechanism 86 and the parking mechanism. Accordingly, as compared with the case that any dedicated selector apparatus is provided for each mechanism, the number of parts can be greatly reduced to thereby greatly reduce the cost and weight of the drive force transmitting apparatus.

Further, in the case that the parking mechanism is operated to effect the lock condition of the vehicle, the clutch mechanism 86 is always kept in its disengaged condition. Conversely, in the case that the clutch mechanism 86 is operated to effect the on-line condition where the electric motor 74 is connected with the drive force transmitting path, the parking mechanism is not operated. Accordingly, it is possible to attain a fail-safe function. That is, a malfunction such that the parking mechanism is operated during running by the electric motor 74 can be reliably prevented.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A drive force transmitting apparatus for a vehicle comprising:
   a drive source;
   a drive force transmitting path adapted to be connected to a drive shaft to transmit a drive force from said drive source to said drive shaft;
   a clutch mechanism capable of connecting and disconnecting said drive force transmitting path;
   a parking mechanism provided in said drive force transmitting path and capable of stopping the rotation of said drive shaft; and
   an actuator mechanism capable of selectively operating said clutch mechanism and said parking mechanism,
   wherein said actuator mechanism comprises a rotating shaft to which a cam portion and a parking pivot portion are fixed, a power source for pivotally rotating said rotating shaft, and an operating fork adapted to be moved by said cam portion for operating said clutch mechanism, said cam portion being inserted in a U-shaped recess of said cam follower connected to said operating fork,
   said clutch mechanism is selectively engaged and disengaged by touch of said cam portion and said U-shaped recess of said cam follower based on rotation of said rotating shaft to thereby move said operating fork,
   said parking mechanism includes a parking pawl adapted to be pivotally rotated by pivotally rotating said parking pivot portion together with said rotating shaft and a parking gear fixed to said drive shaft, said parking pawl being engageable and disengageable with said parking gear only by rotation of said rotating shaft,
   said cam portion is formed so that said cam portion touches said U-shaped recess of said cam follower when said rotating shaft is rotated so as to operate said operating fork, and
   said cam portion is formed so that said cam portion does not touch said U-shaped recess of said cam follower when said rotating shaft is rotated so as to operate said parking mechanism.

2. The drive force transmitting apparatus for a vehicle according to claim 1, wherein said actuator mechanism is switchable among
   a first condition where said clutch mechanism is engaged to connect said drive force transmitting path, and said parking mechanism is disengaged to cancel a parking lock condition, where said drive shaft is fixed in rotation,
   a second condition where said clutch mechanism is disengaged to disconnect said drive force transmitting path, and said parking mechanism is disengaged to cancel said parking lock condition, and
   a third condition where said clutch mechanism is disengaged to disconnect said drive force transmitting path, and said parking mechanism is engaged to effect said parking lock condition.

3. The drive force transmitting apparatus for a vehicle according to claim 1, wherein said cam portion is formed so that said cam portion touches said U-shaped recess of said cam follower when said rotating shaft is rotated so as to engage or disengage said clutch mechanism and said cam portion is formed so that said cam portion does not touch said U-shaped recess of said cam follower when said rotating shaft is rotated so as to engage or disengage said parking mechanism.

* * * * *